(12) United States Patent
Lu

(10) Patent No.: US 8,112,280 B2
(45) Date of Patent: Feb. 7, 2012

(54) SYSTEMS AND METHODS OF PERFORMING SPEECH RECOGNITION WITH BARGE-IN FOR USE IN A BLUETOOTH SYSTEM

(75) Inventor: Younan Lu, Palo Alto, CA (US)

(73) Assignee: Sensory, Inc., Santa Clara, CA (US)

( * ) Notice: Subject to any disclaimer, the term of this patent is extended or adjusted under 35 U.S.C. 154(b) by 1054 days.

(21) Appl. No.: 11/942,201

(22) Filed: Nov. 19, 2007

(65) Prior Publication Data

US 2009/0132255 A1 May 21, 2009

(51) Int. Cl.
*G10L 21/00* (2006.01)
(52) U.S. Cl. ...................................................... 704/270
(58) Field of Classification Search .................. 704/270
See application file for complete search history.

(56) References Cited

U.S. PATENT DOCUMENTS

| | | | | |
|---|---|---|---|---|
| 5,799,065 A * | 8/1998 | Junqua et al. | ............... | 379/88.03 |
| 6,513,006 B2 * | 1/2003 | Howard et al. | ............... | 704/257 |
| 6,868,385 B1 * | 3/2005 | Gerson | ......................... | 704/275 |
| 6,885,991 B2 * | 4/2005 | Skonberg et al. | ............. | 704/270 |
| 6,934,756 B2 * | 8/2005 | Maes | ............................ | 709/227 |
| 7,062,440 B2 * | 6/2006 | Brittan et al. | ................. | 704/266 |
| 7,113,911 B2 * | 9/2006 | Hinde et al. | ................ | 704/270.1 |
| 7,319,992 B2 * | 1/2008 | Gaos | ............................... | 706/62 |

\* cited by examiner

*Primary Examiner* — Susan McFadden
(74) *Attorney, Agent, or Firm* — Chad R. Walsh; Fountainhead Law Group P.C.

(57) ABSTRACT

Embodiments of the present invention improve methods of performing speech recognition with barge-in. In one embodiment, the present invention includes a speech recognition method comprising starting a synthesis of recorded speech, receiving a user speech input signal providing information regarding a user choice, detecting an initial portion of the user speech input signal, selectively altering the synthesis of recorded speech, and recognizing the user choice.

21 Claims, 4 Drawing Sheets

SYSTEMS AND METHODS OF PERFORMING SPEECH RECOGNITION WITH BARGE-IN FOR USE IN A BLUETOOTH SYSTEM

BACKGROUND

The present invention relates to speech recognition, and more particularly to systems and methods of performing speech recognition with barge-in.

Automated voice response systems have been implemented in many businesses allowing clients to get a wide variety of information from on-line voice prompt and user speech recognition devices. These systems allow a user to access information by moving through a hierarchical structure of options which are described to the user by voice prompts. Depending on the number of layers in the hierarchical system and the number of options for each position in the menu tree, the process can be very cumbersome. Use of such systems has been facilitated with the introduction of systems which allow for "barge-in". "Barge-in" allows a user to interrupt the voice prompt and proceed directly to the user's choice. This is helpful for users who successively use a system and already know where they wish to be in the tree structure. However, these sorts of systems require a great deal of processing and memory in order to properly recognize the user speech and may affect the responsiveness, cost, and power consumption of the system. These factors, as well as many others, have prevented the use of speech recognition with barge-in in many electronic devices.

The present invention solves these and other problems with systems and methods of performing speech recognition with barge-in.

SUMMARY

Embodiments of the present invention improve methods of performing speech recognition with barge-in. In one embodiment, the present invention includes an electronic device comprising, a processor comprising a speech synthesizer and a speech recognizer including a recognition set, an analog to digital converter coupled to receive an analog speech input signal and provide corresponding digital speech data to the speech recognizer, a digital to analog converter coupled to receive synthesized speech data from the speech synthesizer and provide a corresponding analog speech output signal, and a nonvolatile memory coupled to provide recorded voice prompt data to the speech synthesizer, the nonvolatile memory comprising data corresponding to a plurality of recorded voice prompts, wherein the processor selectively alters the speech synthesizer.

In one embodiment, the memory is flash memory.

In one embodiment, the data corresponding to a plurality of recorded voice prompts includes wave files.

In one embodiment, the speech synthesizer includes on-off control.

In one embodiment, the electronic device is a portable electronic device.

In one embodiment, the electronic device is enabled to communicate over a wireless personal area network.

In one embodiment, the electronic device is a wireless headset.

In one embodiment, the processor selectively alters the speech recognizer,

In one embodiment, the speech recognizer employs a selectively enabled echo canceller.

In one embodiment, the speech recognizer employs a selectively enabled voice recognition threshold adjuster.

In one embodiment, the present invention includes a speech recognition method comprising starting a synthesis of recorded speech to prompt a user to communicate a user choice, wherein an element in a recognition set corresponds to the user choice, receiving a user speech input signal providing information regarding the user choice, detecting an initial portion of the user speech input signal, selectively altering the synthesis of recorded speech in response to detecting the initial portion of the user speech input signal, wherein the altering improves the recognition of the user choice, and recognizing the user choice, wherein the recognizing includes determining the element in the recognition set which corresponds to the user choice.

In one embodiment, the synthesis of recorded speech includes piping a wave file.

In one embodiment, selectively altering the synthesis of recorded speech includes changing the volume.

In one embodiment, selectively altering the synthesis of recorded speech includes muting the sound.

In one embodiment, the method further comprises selectively altering the recognizing in response to detecting the initial portion of the user speech input signal, wherein the altering improves the recognition of the user choice.

In one embodiment, selectively altering the recognizing includes providing echo cancelling.

In one embodiment, selectively altering the recognizing includes changing the voice recognition threshold.

In one embodiment, the present invention includes a speech recognition method comprising starting a synthesis of recorded speech to prompt a user to communicate a user choice, wherein an element in a recognition set corresponds to the user choice, receiving a user speech input signal providing information regarding the user choice, detecting an initial portion of the user speech input signal, selectively altering the recognizing in response to detecting the initial portion of the user speech input signal, wherein the altering improves the recognition of the user choice, and recognizing the user choice, wherein the recognizing includes determining the element in the recognition set which corresponds to the user choice.

In one embodiment, selectively altering the recognizing includes providing echo cancelling.

In one embodiment, selectively altering the recognizing includes changing the voice recognition threshold.

DETAILED DESCRIPTION

Described herein are techniques for performing speech recognition with barge-in. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
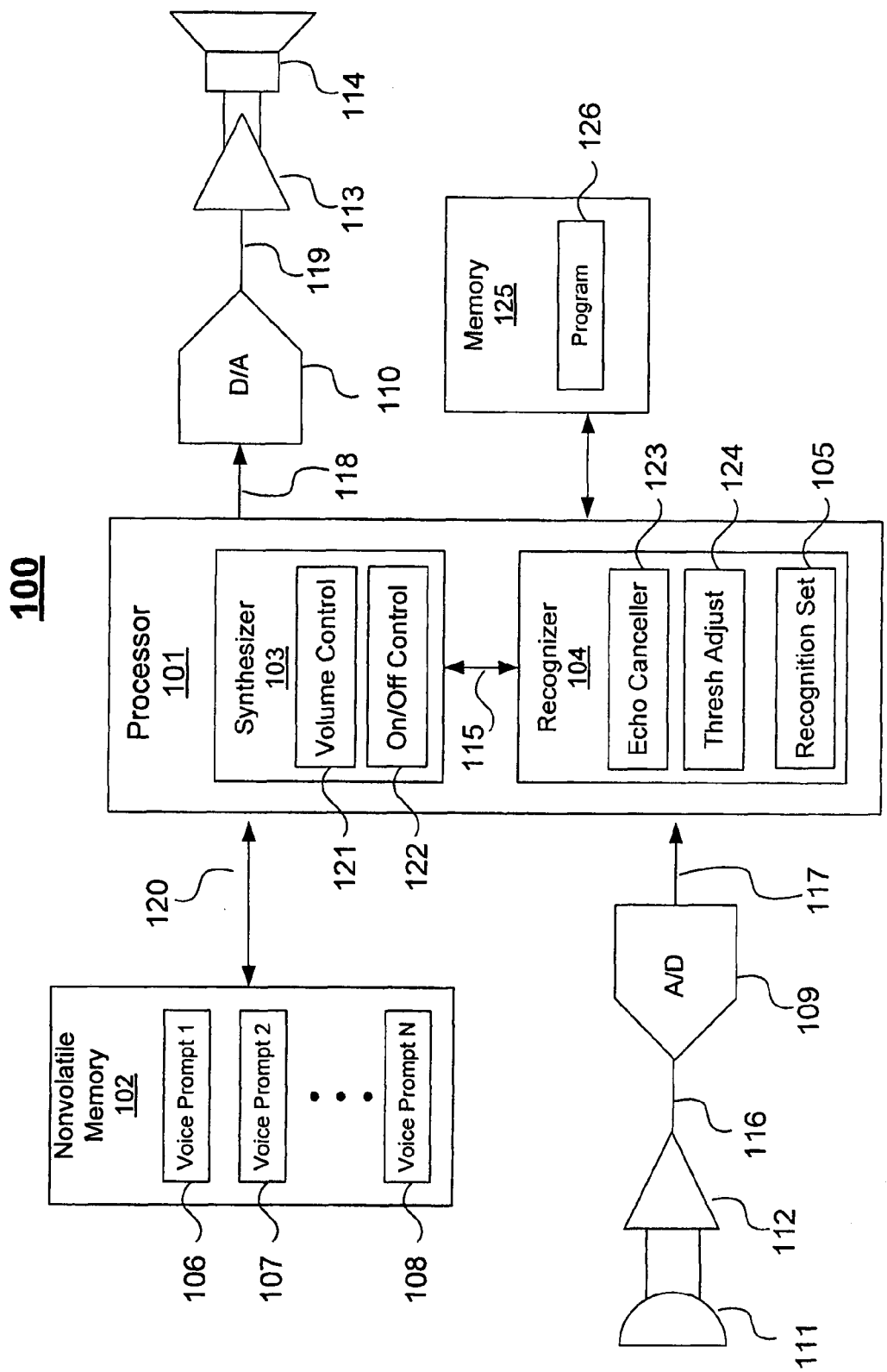
FIG. 1 illustrates an apparatus for performing speech recognition with barge-in according to one embodiment of the present invention.

FIG. 1 illustrates an apparatus for performing speech recognition with barge-in according to one embodiment of the present invention. FIG. 1 includes an electronic device 100. The electronic device may be a cellular phone, a personal digital assistant, a portable game, or any other portable electronic device, for example. The electronic device may be a head set or other device which is enabled to communicate over a wireless personal area network. The electronic device includes processor 101, a nonvolatile memory 102, a memory 125, an analog-to-digital (A/D) converter 109, a digital-to-analog converter (D/A) 110, a microphone 111, an input amplifier 112, a output amplifier 113, and a speaker 114. The processor 101 may be a digital signal processor (DSP) a central processing unit (CPU), a microcontroller core, or microprocessor. The memory 125 includes a program 126. There may be additional programs in the memory 125. The memory 125 may be random access memory (RAM), a read only memory (ROM) or any other appropriate memory device for storing a program 126. The program may be an assembly program, a machine code program, or any program suitable for running on a microprocessor, microcontroller, or digital signal processor. The non-volatile memory 102 includes a plurality of voice prompt data represented by voice prompt 1 (106), voice prompt 2 (107), and voice prompt N (108). This nonvolatile memory may be flash memory. The processor 101 includes a speech synthesizer 103, and a speech recognizer 104. The speech recognizer includes a recognition set 105, echo canceller 123, and voice recognition threshold adjuster 124. The speech synthesizer 103 includes a volume control 121 and a on/off control 122. The output of microphone 111 is coupled to the input of amplifier 112. The output of amplifier 112 is coupled to provide a analog speech input signal at 116 to the input of the A/D 109. The output of the A/D 109 is coupled provide a digital speech data at 117 to processor 101. The memory is coupled to provide recorded voice prompt data at 120 to processor 101. The processor is also coupled to provide synthesized speech data at 118 to D/A 110. The output of the D/A is coupled to provide an analog speech output signal at 119 to amplifier 113. Amplifier 113 is coupled to speaker 114 to provide an audio output. A memory management unit (MMU) may be configured to couple the processor with the memory 125, the nonvolatile memory 102, the A/D 109, and the D/A 110. A digital signal processor (DSP) may include CPU, memory management unit, memory 125, A/D 109, and D/A 110.

The apparatus produces voice prompts to a user and allows a user to barge-in to the process by uttering a user choice. The barge-in or interruption of a process running may happen prior to the beginning of the voice prompt or during the voice prompt. The processor 101 begins a first process for activating the audio in input channel which allows A/D 109 to receive an analog speech input signal at 116 from microphone 111 via amplifier 112. The A/D 109 may be in a low current mode prior to the beginning of this first process in order to conserve power. At this time the processor 101 may be waiting for data which would communicate that a barge-in event has occurred. The processor 101 selects an appropriate voice prompt from memory 102. The memory 102 contains a plurality of recorded voice prompts. For example, voice prompt 1 (106), voice prompt 2 (107), and voice prompt N (108) represent an application which may require up to "N" voice prompts. The memory provides recorded voice prompt data for the user. These voice prompts may be complete messages in flash memory or other nonvolatile memory. The data corresponding to a plurality of recorded voice prompts may include wave files. The synthesizer 103 may be moving the data directly to the D/A 110, for example. The D/A 110 provides an analog speech output signal at 119 to the amplifier 113 and subsequently to speaker 114. Any time after the beginning of the first process or during the outputting of the voice prompt, a user may utter a user choice. When the user utters a choice, the microphone 111 converts the sound waves to an electrical signal. An amplifier 112 may amplify this signal. This is the analog speech input signal at 116 which is converted to digital by A/D 109 and provides the digital speech data at 117 which corresponds to the analog speech input signal at 116. The processor may detect the initial portion of the user speech input signal, and the speech synthesizer may selectively adjust the speech synthesizer 103 in response to the detection of an initial portion of the user speech input signal. This altering is intended to improve the speech recognition of the user choice. The user choice would be represented by a list of choices corresponding to the recognition set 105. An example of altering the synthesizer 103 may be to reduce the volume of the recorded prompt so that the analog speech input signal at 116 is less corrupted by the voice prompt. Reducing the volume may be implemented by dividing the wave file data by some integer value, for example. This may be done by a volume control 121. Another example of altering the synthesis of recorded speech is turning the voice prompt off. This may be done by an on/off control 122 or a mute control. Turning off or muting the synthesis of speech may be accomplished by dividing the wave file data by a very large integer. This would effectively mute the sound. During this time the recognizer 104 may be working to recognize the user choice, wherein the user choice includes determining the element in the recognition set 105 which corresponds to the user choice. Speech synthesizer 103 and speech recognizer 104 are configured to work in concert 115 within processor 101. For example, the synthesized voice prompts may be piped from a bank of flash memory to the D/A 110 and the recognizer may interrupt the flow of data out of the synthesizer when the recognizer or some auxiliary detection circuit indicates that a barge-in has occurred by some detection of an initial portion of an utterance.

In another embodiment the processor 101 may selectively alter the speech recognizer 104. For example, the incoming data at 117 may still have some sound information associated with the voice prompt analog speech output signal at 119. In this example, the processor may employ a selectively enabled echo canceller 123. The processor 101 may use the voice prompt data 120 to employ this echo cancelling. This echo cancelling may be a process prior to a core recognition algorithm. In another example, the processor may employ a selectively enabled voice recognition threshold adjuster 124. This may decrease the threshold in which a NOTA (none of the above) result may be the result, for example. With a great deal of interference from the voice prompt, the processor may set a high threshold in order to prevent an erroneous recognition. However, at times a user may barge-in prior to the starting of the synthesis of recorded speech and the processor may decrease the recognition threshold for NOTA in order to improve the recognition of the user choice, for example.

Figure 2:
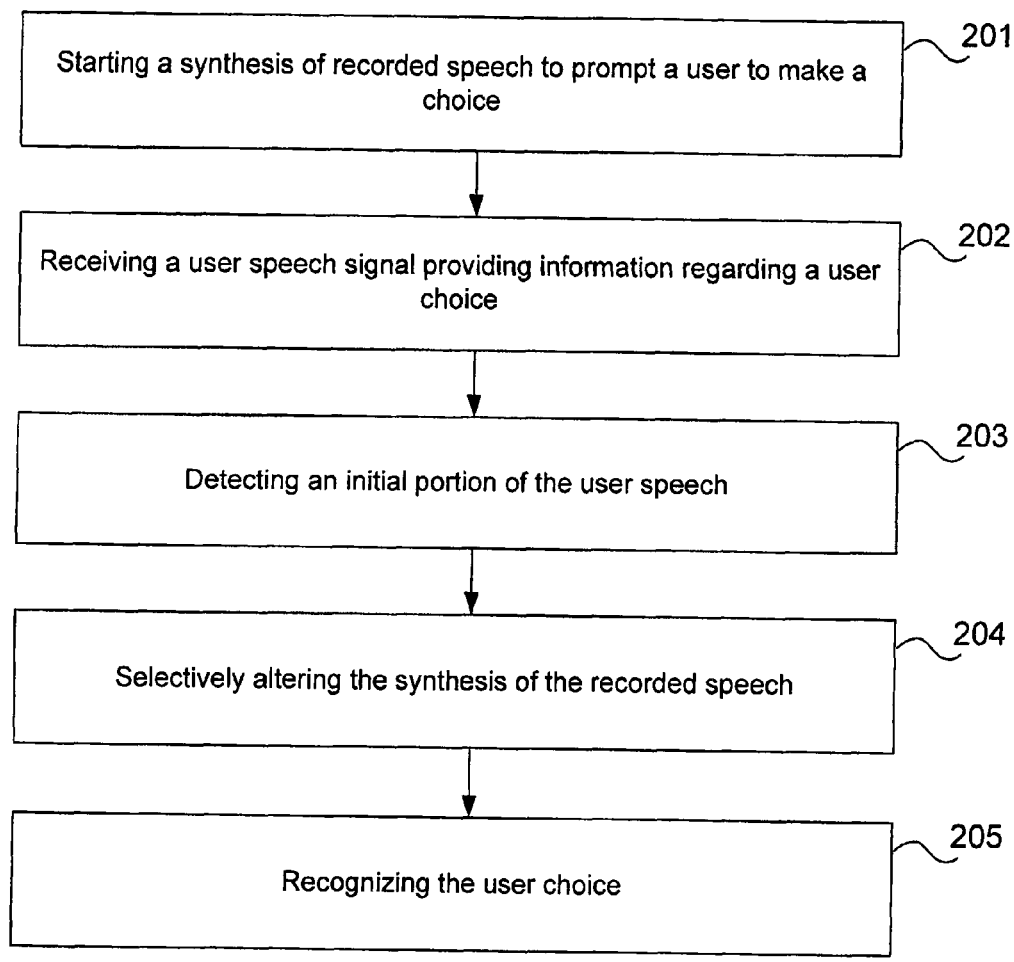
FIG. 2 illustrates a method for performing speech recognition with barge-in according to one embodiment of the present invention.

FIG. 2 illustrates a method 200 for performing speech recognition with barge-in according to one embodiment of the present invention. At 201, a synthesis of recorded speech to prompt a user to communicate a user choice is started, wherein an element in a recognition set corresponds to a user choice. The synthesis may include piping a wave file, for example. In one example, a memory stores voice prompts which may be a group of wave file which are piped through a processor and out of a speaker. In this way, a minimum of processing is required to synthesize the speech. In this example, a processor may control the piping of the wave file. Example processing elements may be a DSP core, a CPU (central processing unit) core, a peripheral processor controlled by a CPU, and a MMU. At 202, a user speech signal providing information regarding the user choice is received. This signal may be a digital signal which has already been converted from an analog signal, such as an analog signal from a microphone, or an actual sound wave impinging on a microphone. At 203, an initial portion of the user speech input signal is detected. This detection may be a magnitude threshold detection. At 204, the synthesis of recorded speech is selectively altered. This is done in response to detecting the initial portion of the user speech input signal, wherein the altering improves the recognition of the user choice. The selectively altering the synthesis of recorded speech may include changing the volume, for example. The selectively altering the synthesis of recorded speech may include muting the sound, for example. The selectively altering the synthesis of recorded speech may include substituting alternate synthesis data such as a tone, for example. Some synthesized audio signals may be easier to cancel out during the recognition process. At 205, the user choice is recognized, wherein the recognizing includes determining the element in the recognition set 105 which corresponds to the user choice.

Figure 3:
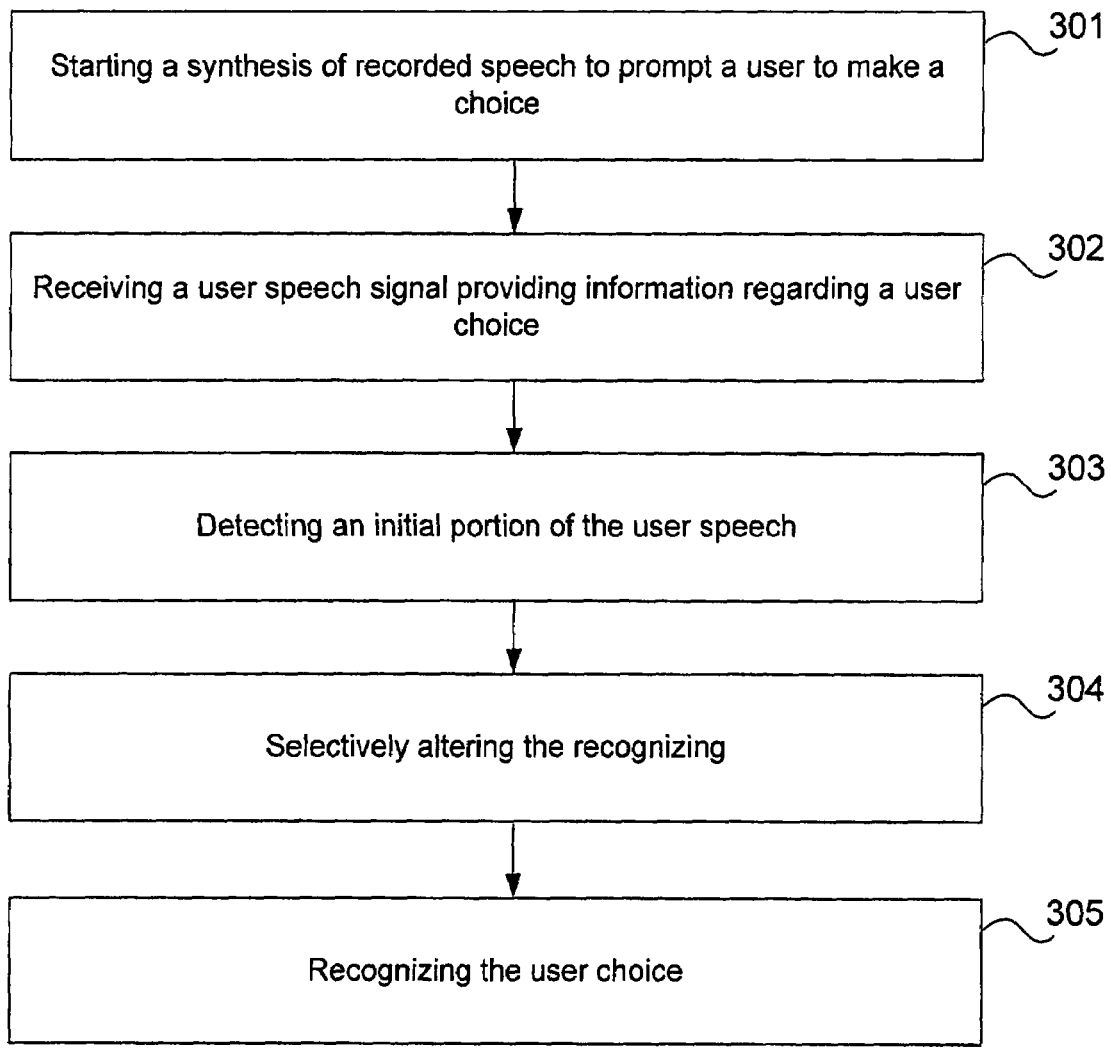
FIG. 3 illustrates another method for performing speech recognition with barge-in according to another embodiment of the present invention.

FIG. 3 illustrates another method 300 for performing speech recognition with barge-in according to another embodiment of the present invention. At 301, a synthesis of recorded speech to prompt a user to communicate a user choice is started, wherein an element in a recognition set corresponds to a user choice. The synthesis may include moving a recorded voice prompt. In one example, a memory is made up of voice prompts which are segments of speech which are assembled through a processor and out of a speaker. At 302, a user speech signal providing information regarding the user choice is received. This signal may be a digital signal which has already been converted from an analog signal, an analog signal from a microphone, or an actual vocal expression from the user. At 303, an initial portion of the user speech input signal is detected. This detection may be simple magnitude threshold detection or detection based on signal content. At 304, the recognizing is selectively altered in response to the detecting of the initial portion of the user speech input signal, wherein the altering improves the recognition of the user choice. The selectively altering of the recognizing may include providing echo cancelling, for example. An example of echo cancelling has been described in a previous embodiment. The selectively altering of the recognizing may include changing the voice recognition threshold, for example. An example of changing the voice recognition threshold has been described in a previous embodiment. At 305, the user choice is recognized, wherein the recognizing includes determining the element in the recognition set which corresponds to the user choice.

Figure 4:
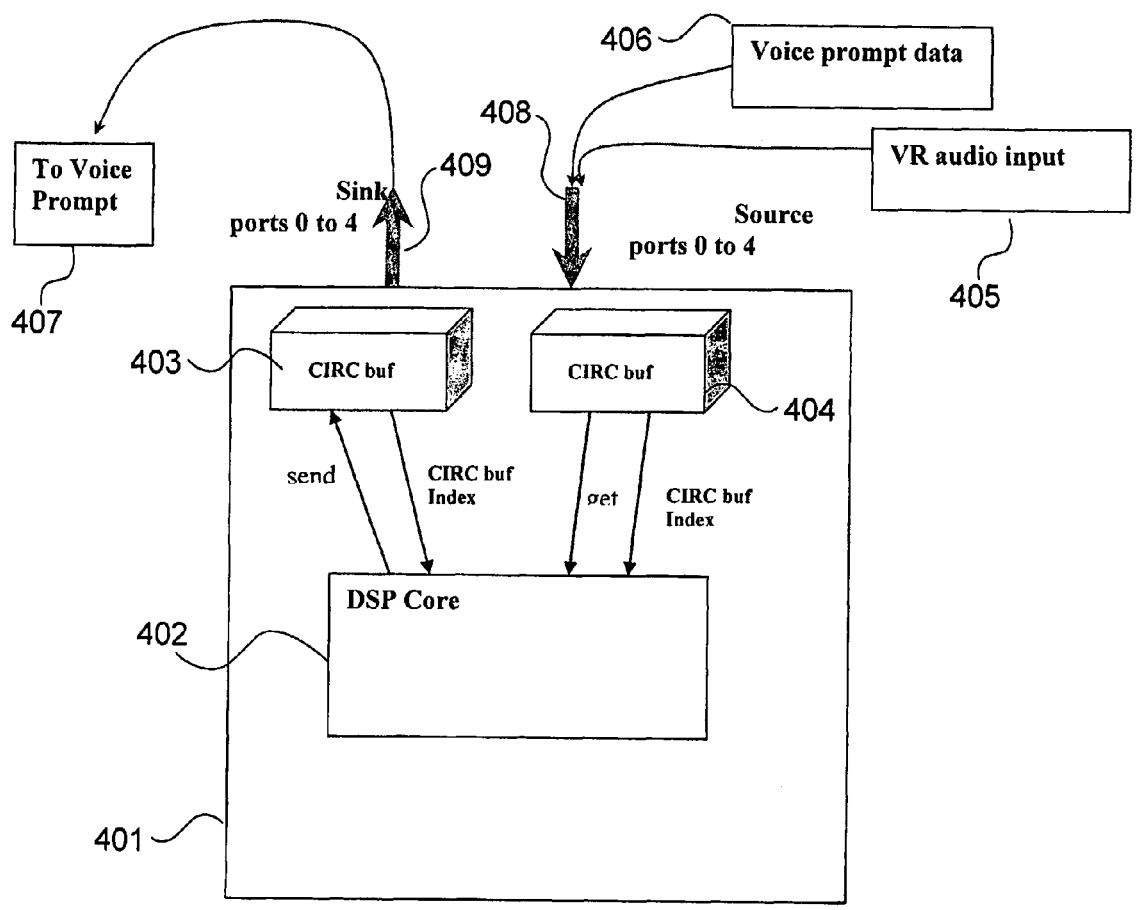
FIG. 4 illustrates the memory management for performing speech recognition with barge-in according to another embodiment of the present invention.

FIG. 4 illustrates the memory management for performing speech recognition with barge-in according to another embodiment of the present invention. FIG. 4 includes a memory management unit (MMU) 401, a DSP core 402, a voice prompt (VP) output circuit 407, a VP data repository 406, and a voice recognition (VR) input circuit 405. The MMU 401 includes an output circular buffer 403, an input circular buffer 404, source ports 408, and sink ports 409. The VP repository 406 is coupled to one port of the source ports 408. The VP repository may be a nonvolatile memory as described above. The VR input circuit 405 is coupled to another port of the source ports 408. The VR input circuit may be an analog to digital converter coupled to receive a barge-in utterance from a microphone, for example. The VP repository 406 may be coupled to port 1 of the source ports 408, and the VR input circuit 405 may be coupled to port 2 of the source ports 408. The source ports are coupled to convey the source data to the DSP core 402 through the input circular buffer 404. The VP output circuit is coupled to receive data from the sink ports 409 of the MMU 401. The VP output circuit 407 may be a digital to analog circuit coupled to an amplifier to provide a signal to a speaker, for example. The VP output circuit may be coupled to port 1 of the sink ports 409, for example. The sink ports 409 are coupled to receive the sink data from the DSP core 402 through output circular buffer 403. In this example the output data being received by the VP output circuit 407 is being clocked at 8 kHz and the data from the VR input circuit 405 is being clocked at 16 kHz. Both the circular buffers (403 and 404) may run independently and may have different clock systems. Since both the source and sink data running through the ports is processed by the same DSP core, packets may be dropped by the DSP core when both circular buffers are running simultaneously. Since, the source data provided for voice recognition is more critical than voice prompt sink data, the DSP may be configured to allow some packets of information to be repeated for the voice prompt so that more voice recognition data is preserved for processing. This results in a beneficial tradeoff. The voice prompt will not lose much in audible output by having a packet repeated, and this will allow more of the important voice recognition data to be processed in the recognition of the user choice.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. An apparatus including an electronic device, the electronic device comprising:
   a processor comprising:
      a speech synthesizer; and
      a speech recognizer including a recognition set and an echo canceller;
   an analog to digital converter coupled to receive an analog speech input signal and provide corresponding digital speech data to the speech recognizer;
   a digital to analog converter coupled to receive synthesized speech data from the speech synthesizer and provide a corresponding analog speech output signal; and
   a memory coupled to provide recorded voice prompt data to the speech synthesizer, the memory comprising:
      data corresponding to a plurality of recorded voice prompts, wherein an audio input channel is activated to receive the analog speech input signal, wherein the speech synthesizer outputs one of the voice prompts as the analog speech output signal, and wherein after the audio input channel is activated and during the outputting of the voice prompts, the audio input channel receives a user speech input signal, and in accordance therewith, the volume of the analog speech output signal is reduced and the echo canceller is enabled and uses data for said one of the voice prompts from memory to perform echo cancellation on the user speech input signal.

2. The apparatus of claim 1 wherein the memory is flash memory.

3. The apparatus of claim 1 wherein the data corresponding to a plurality of recorded voice prompts includes wave files.

4. The apparatus of claim 1 wherein the speech synthesizer includes volume control.

5. The apparatus of claim 1 wherein the speech synthesizer includes on-off control.

6. The apparatus of claim 1 wherein the electronic device is a portable electronic device.

7. The apparatus of claim 1 wherein the electronic device is enabled to communicate over a wireless personal area network.

8. The apparatus of claim 1 wherein the electronic device is a wireless headset.

9. The apparatus of claim 1 wherein the processor selectively alters the speech recognizer.

10. The apparatus of claim 9 wherein the speech recognizer employs a selectively enabled echo canceller.

11. The apparatus of claim 9 wherein the speech recognizer employs a selectively enabled voice recognition threshold adjuster.

12. A speech recognition method comprising:
starting a synthesis of recorded speech to prompt a user to communicate a user choice, wherein an element in a recognition set corresponds to the user choice;
receiving a user speech input signal providing information regarding the user choice;
detecting an initial portion of the user speech input signal;
selectively altering the synthesis of recorded speech in response to detecting the initial portion of the user speech input signal, wherein selectively altering the synthesis of recorded speech includes changing the volume; and
recognizing the user choice, wherein the recognizing includes determining the element in the recognition set which corresponds to the user choice.

13. The method of claim 12 wherein the synthesis of recorded speech includes piping a wave file.

14. The method of claim 12 wherein selectively altering the synthesis of recorded speech includes muting the sound.

15. The method of claim 12 wherein the synthesis includes transferring packets of synthesis data, wherein selectively altering the synthesis of recorded speech includes dropping at least one packet of the packets of synthesis data.

16. The method of claim 12 wherein the selectively altering the synthesis of recorded speech includes substituting alternate synthesis data.

17. The method of claim 12 further comprising selectively altering the recognizing in response to detecting the initial portion of the user speech input signal.

18. The method of claim 17 wherein selectively altering the recognizing includes providing echo cancelling.

19. The method of claim 17 wherein selectively altering the recognizing includes changing the voice recognition threshold.

20. A speech recognition method comprising:
starting a synthesis of recorded speech to prompt a user to communicate a user choice, wherein an element in a recognition set corresponds to the user choice;
receiving a user speech input signal providing information regarding the user choice;
detecting an initial portion of the user speech input signal;
echo canceling the user speech input signal using data corresponding to said recorded speech in response to detecting the initial portion of the user speech input signal; and
recognizing the user choice, wherein the recognizing includes determining the element in the recognition set which corresponds to the user choice.

21. The method of claim 20 further comprising decreasing a voice recognition threshold corresponding to a none of the above (NOTA) result when the user speech input signal is received prior to the start of the recorded speech.

* * * * *